United States Patent
Yoshikawa

(10) Patent No.: US 10,609,738 B2
(45) Date of Patent: Mar. 31, 2020

(54) MOBILE ROUTER, MOBILE NETWORK SYSTEM, ELECTRONIC MONEY TRANSACTION METHOD AND ELECTRONIC MONEY TRANSACTION PROGRAM

(71) Applicant: NEC Platforms, Ltd., Kawasaki-shi, Kanagawa (JP)

(72) Inventor: Masato Yoshikawa, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/571,864

(22) PCT Filed: Mar. 1, 2016

(86) PCT No.: PCT/JP2016/056181
§ 371 (c)(1),
(2) Date: Nov. 6, 2017

(87) PCT Pub. No.: WO2017/010118
PCT Pub. Date: Jan. 19, 2017

(65) Prior Publication Data
US 2018/0124856 A1    May 3, 2018

(30) Foreign Application Priority Data
Jul. 14, 2015    (JP) .................. 2015-140381

(51) Int. Cl.
*H04W 76/10*    (2018.01)
*G06Q 20/20*    (2012.01)
(Continued)

(52) U.S. Cl.
CPC .......... *H04W 76/10* (2018.02); *G06Q 20/065* (2013.01); *G06Q 20/204* (2013.01);
(Continued)

(58) Field of Classification Search
CPC ..... H04W 76/10; H04W 88/04; H04W 88/10; H04W 76/15; H04W 76/14; G06Q 20/425;
(Continued)

(56) References Cited

U.S. PATENT DOCUMENTS

| 6,151,493 A | 11/2000 | Sasakura et al. |
| 2003/0037264 A1 | 2/2003 | Ezaki et al. |

(Continued)

FOREIGN PATENT DOCUMENTS

| JP | 11-088499 A | 3/1999 |
| JP | 2003-058509 A | 2/2003 |

(Continued)

OTHER PUBLICATIONS

Written Opinion of the International Searching Authority of PCT/JP2016/056181 dated May 31, 2016.
(Continued)

*Primary Examiner* — Michael Y Mapa
(74) *Attorney, Agent, or Firm* — Sughrue Mion, PLLC

(57) ABSTRACT

Provided is a mobile network system including a mobile terminal and a mobile router configured to perform wireless communication to and from the mobile terminal, the mobile router including: a near field wireless communication unit configured to perform communication for processing relating to electronic money; a wireless communication unit configured to perform wireless communication to and from the mobile terminal; and a storage unit configured to store information on a mobile terminal that uses the mobile router to perform communication and information on a mobile terminal that is allowed to use electronic money, the mobile terminal including: a wireless communication unit config-
(Continued)

ured to perform wireless communication to and from the mobile router; and a storage unit configured to store information on the mobile router.

10 Claims, 9 Drawing Sheets

(51) Int. Cl.
    *G06Q 20/32*     (2012.01)
    *G06Q 20/42*     (2012.01)
    *G06Q 20/06*     (2012.01)
    *H04W 88/10*     (2009.01)
    *H04W 88/04*     (2009.01)
    *H04W 76/15*     (2018.01)
    *H04W 76/14*     (2018.01)

(52) U.S. Cl.
    CPC ....... *G06Q 20/325* (2013.01); *G06Q 20/3226* (2013.01); *G06Q 20/3278* (2013.01); *G06Q 20/425* (2013.01); *H04W 88/10* (2013.01); *H04W 88/04* (2013.01)

(58) Field of Classification Search
    CPC ............. G06Q 20/3226; G06Q 20/204; G06Q 20/3278; G06Q 20/065; G06Q 20/325
    USPC .......................... 455/414.1–414.4, 41.1–41.3
    See application file for complete search history.

(56) References Cited

U.S. PATENT DOCUMENTS

| | | | | |
|---|---|---|---|---|
| 2009/0170483 | A1* | 7/2009 | Barnett | G06Q 20/32 455/414.2 |
| 2013/0290522 | A1* | 10/2013 | Behm, Jr. | H04L 43/10 709/224 |
| 2014/0141718 | A1* | 5/2014 | Stromberg | G06Q 20/32 455/41.1 |
| 2015/0081539 | A1 | 3/2015 | Mizuno et al. | |
| 2018/0176756 | A1* | 6/2018 | Buscemi | H04B 5/0031 |

FOREIGN PATENT DOCUMENTS

| | | | | |
|---|---|---|---|---|
| JP | 2007-019748 A | 1/2007 | | |
| JP | 2014-215802 A | 11/2014 | | |
| JP | 2015-060444 A | 3/2015 | | |
| WO | WO-2011089423 A2 * | 7/2011 | ............. | G06F 21/35 |

OTHER PUBLICATIONS

International Search Report of PCT/JP2016/056181 dated May 31, 2016.

* cited by examiner

MOBILE ROUTER, MOBILE NETWORK SYSTEM, ELECTRONIC MONEY TRANSACTION METHOD AND ELECTRONIC MONEY TRANSACTION PROGRAM

CROSS REFERENCE TO RELATED APPLICATIONS

This application is a National Stage of International Application No. PCT/JP2016/056181 filed Mar. 1, 2016, claiming priority based on Japanese Patent Application No. 2015-140381, filed Jul. 14, 2015, the contents of all of which are incorporated herein by reference in their entirety.

TECHNICAL FIELD

This invention relates to a mobile router, a mobile network system, an electronic money transaction method, and an electronic money transaction program, and more particularly, to a mobile router configured to perform wireless communication to/from a mobile terminal, a mobile network system, an electronic money transaction method, and an electronic money transaction program.

BACKGROUND ART

A mobile terminal with an electronic money function is now put into practical use. Further, a mobile network system using a mobile terminal and a mobile router is disclosed in, for example, Patent Document 1.

In Patent Document 1, there is disclosed a mobile network connection method for preventing, for example, unauthorized usage, unauthorized access, and information leakage when one or both of the mobile terminal and the mobile router are stolen.

PRIOR ART DOCUMENTS

Patent Document

Patent Document 1: JP 2014-215802 A

SUMMARY OF THE INVENTION

Problem to be Solved by the Invention

It is evident that a mobile terminal without an electronic money function does not enable electronic money transaction. Further, even a mobile terminal that has an electronic money function and enables electronic money transaction does not enable electronic money transaction with electronic money of a different specification. For example, a mobile terminal that has an electronic money function and enables electronic money transaction in Japan does not enable electronic money transaction in foreign countries. Similarly, a mobile terminal that has an electronic money function and enables electronic money transaction in foreign countries does not enable electronic money transaction in Japan.

It is an exemplary object of this invention to provide a mobile router, a mobile network system, an electronic money transaction method, and an electronic money transaction program, which enable electronic money transaction even for a mobile terminal that cannot use an electronic money function.

Means to Solve the Problem

The first aspect of the present invention is to provide a mobile router, which is configured to perform transaction of electronic money, the mobile router comprising a first wireless communication unit configured to perform communication by a first wireless communication method; a second wireless communication unit configured to perform communication by a second wireless communication method different from the first wireless communication method; and a storage unit configured to register a mobile terminal that is allowed to use transaction of electronic money. The mobile router is configured to perform transaction of electronic money through communication by the first wireless communication unit when the mobile router has confirmed presence of the mobile terminal through communication to and from the mobile terminal by the second wireless communication unit before transaction of electronic money.

The second aspect of the present invention is to provide an electronic money transaction method, which is executed by a mobile router configured to perform transaction of electronic money through communication by a first wireless communication method and communicate to and from a mobile terminal that is allowed to use the transaction of electronic money through communication by a second wireless communication method different from the first wireless communication method. The electronic money transaction method comprises performing transaction of electronic money through communication by the first wireless communication method when having confirmed presence of the mobile terminal through communication to and from the mobile terminal by the second wireless communication method before transaction of electronic money.

The third aspect of the present invention is to provide an electronic money transaction program for causing a computer, which functions as a mobile router configured to perform transaction of electronic money through communication by a first wireless communication method and communicate to and from a mobile terminal that is allowed to use the transaction of electronic money through communication by a second wireless communication method different from the first wireless communication method, to execute the procedures of confirming presence of the mobile terminal through communication to and from the mobile terminal by the second wireless communication method before transaction of electronic money and performing transaction of electronic money through communication by the first wireless communication method when having confirmed presence of the mobile terminal.

Effect of the Invention

A representative effect of this invention is to enable electronic money transaction even for a mobile terminal that cannot use the electronic money function.

MODES FOR EMBODYING THE INVENTION

In the following, embodiments of this invention are described in detail with reference to the drawings.

First Embodiment

A first embodiment of this invention is described with reference to FIG. 1 to FIG. 5.

Figure 1:
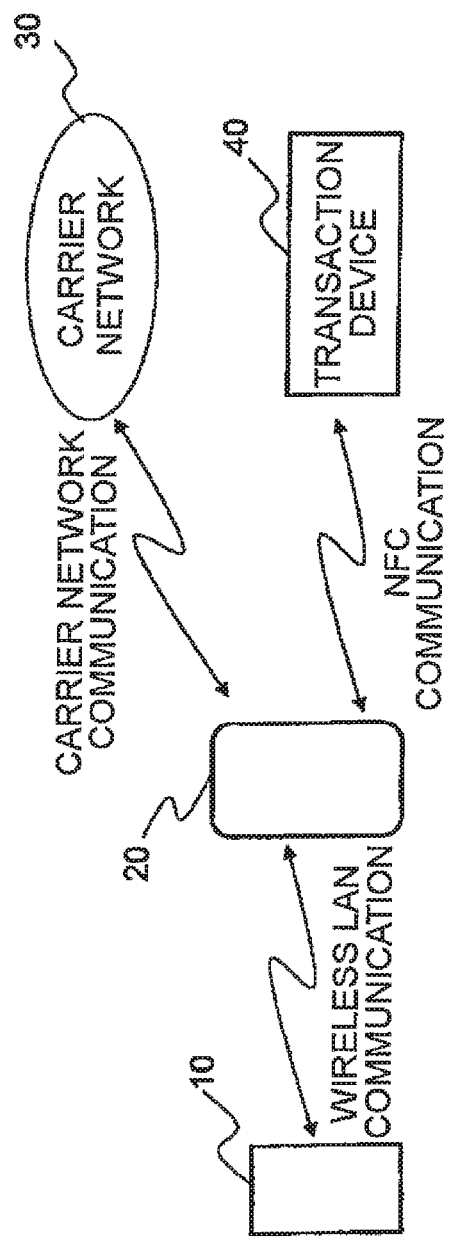
FIG. 1 is a configuration diagram of a mobile network system in which a mobile router according to an embodiment of this invention is used.

FIG. 1 is a configuration diagram of a mobile network system in which a mobile router according to an embodiment of this invention is used.

As illustrated in FIG. 1, a mobile terminal 10 has a wireless LAN communication function, and a mobile router 20 has a wireless LAN communication function, a carrier network communication (wide area communication) function, and an electronic money function using near field communication (NFC). The mobile router 20 can use the carrier network communication function to perform carrier network communication (wide area communication) to/from a carrier network 30, and can perform NFC communication to/from a transaction device 40 using an NFC communication function. Regarding NFC, NFC IP-1 is set as the international standard ISO/IEC 18092 on December 2003, and NFC IP-2, which is an extended standard, is set as the international standard ISO/IEC 21481 on January 2005 to date. In NFC IP-1, specifications of communication that supports MIFARE (compliant to ISO/IEC 14443 Type A) and FeliCa, and a protocol for communication between terminals are defined. In NFC IP-2, specifications of communication that supports ISO/IEC 14443 Type B and ISO/IEC 15693 are defined in addition to those of NFC IP-1.

Figure 2:
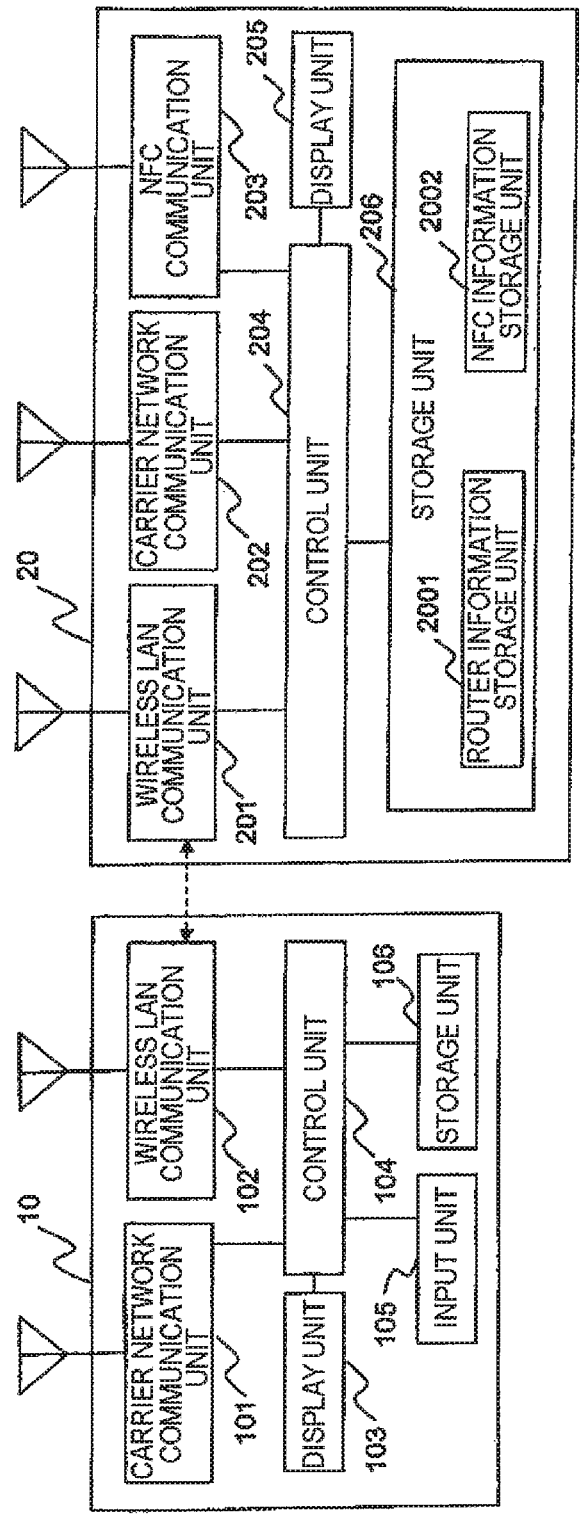
FIG. 2 includes configuration diagrams of a mobile terminal and the mobile router.

FIG. 2 is configuration diagrams of a mobile terminal and the mobile router. The mobile terminal 10 includes a carrier network communication unit 101, a wireless LAN communication unit 102, a display unit 103, a control unit 104, an input unit 105, and a storage unit 106. The control unit 104 is configured to control the carrier network communication unit 101, the wireless LAN communication unit 102, the display unit 103, the input unit 105, and the storage unit 106. The mobile terminal 10 may not include the carrier network communication unit 101.

The mobile router 20 includes a wireless LAN communication unit 201 (corresponding to second wireless communication unit), a carrier network communication unit 202, an NFC communication unit 203 (corresponding to first wireless communication unit), a control unit 204, a display unit 205, and a storage unit 206. The control unit 204 is configured to control the wireless LAN communication unit 201, the carrier network communication unit 202, the NFC communication unit 203, the display unit 205, and the storage unit 206. The storage unit 206 includes a router information storage unit 2001 and an NFC information storage unit 2002. The NFC communication unit 203 is configured to perform communication for processing relating to electronic money. The processing relating to electronic money is, for example, transaction processing of transacting electronic money with a transaction device, a request to an electronic money management device for reference to a history/statement of transactions of electronic money, and a request to an electronic money charging device for electronic money charging processing.

The wireless LAN communication unit 102 of the mobile terminal 10 and the wireless LAN communication unit 201 of the mobile router 20 perform wireless LAN communication to/from each other. The mobile terminal 10 can not only perform carrier network communication (wide area communication) via the carrier network communication unit 101, but also perform wireless LAN communication to/from the mobile router 20 for the carrier network communication (wide area communication) via the carrier network communication unit 202 of the mobile router 20. Further, the mobile terminal 10 can use the electronic money function of the mobile router 20 to transact electronic money with the transaction device 40 through NFC communication via the NFC communication unit 203 of the mobile router 20. In FIG. 1, the transaction device 40 for performing processing of transacting electronic money is illustrated. However, when the mobile router 20 performs processing of referring to the history/statement of transactions of electronic money, the transaction device 40 is replaced by a processing target device 50, and when the mobile router 20 performs electronic money charging processing, the transaction device 40 is replaced by an electronic money charging device 60.

The input unit 105 of the mobile terminal 10 is formed of, for example, an input key, and the display unit 103 is formed of, for example, a liquid crystal display device. However, the input unit and the display unit may be integrated using a touch panel and a liquid crystal display device. The display unit 205 of the mobile router 20 is formed of, for example, a liquid crystal display device.

The router information storage unit 2001 stores information on the configuration of the mobile router 20 and settings information on operation of the router. The settings information includes, for example, an access point name (APN) and a service set identifier (SSID). The NFC information storage unit 2002 stores unique identification (ID) information assigned to an NFC communication device and information on NFC communication usage. The information on NFC communication usage is, for example, the balance and usage history of NFC communication.

As described above, the mobile terminal 10 can use the electronic money function of the mobile router 20 to transact electronic money. Further, the mobile terminal 10 can request the mobile router 20 for processing relating to electronic money (e.g., charging electronic money, referring to history/statement, or checking balance) to obtain the result of processing.

The mobile router 20 is provided by, for example, a rental company of the mobile router 20 as a rental device. Otherwise, the mobile router 20 may be provided as a commercial product purchased by a user.

The mobile terminal 10 has a downloaded dedicated application program to transact electronic money or to obtain the result of processing relating to electronic money. The application program is downloaded from a server of the rental company of the mobile router 20 or a device, for example, a router of a company providing services indirectly via the mobile router 20 through wireless LAM communication or carrier network communication via the mobile router 20.

Further, information on the mobile terminal 10 is registered in the storage unit 206 of the mobile router 20 and information on the mobile router 20 is registered in the storage unit 106 of the mobile terminal 10 in order for the mobile terminal 10 to use the mobile router 20.

Registration of information on the mobile terminal 10 with the mobile router 20 includes registration of information on a mobile terminal that can perform communication using the mobile router 20 and registration of information on a mobile terminal that can use electronic money.

The information on the mobile terminal 10 is registered with the mobile router 20 by designating an IP address (Internet Protocol address) of the mobile router using, for example, a personal computer (PC), and then transmitting the information on the mobile terminal 10 via wireless LAN communication. The mobile router 20 receives the information on the mobile terminal 10 via the wireless LAN communication unit 201. The mobile router 20 may register not one but a plurality of mobile terminals that can perform communication using the mobile router 20. Further, the mobile router 20 may register not one but a plurality of mobile terminals that can use electronic money of the mobile router 20.

The mobile router 20 registers the information on a mobile terminal that can use electronic money by a method (1) or (2) described below.

(1) Register a mobile terminal that can use electronic money in an identifiable manner by, for example, a flag, among registered mobile terminals that can perform communication, (2) Register the information on a mobile terminal that can use electronic money separately from the information on a mobile terminal that can perform communication.

Only the provider of a mobile router is assumed to be capable of registering information on a mobile terminal that can use electronic money with the mobile router. The provider of the mobile router is a rental company of the mobile router in this embodiment. When the user of a mobile terminal is also allowed to register information, a password for authentication is stored in the mobile router in advance, and the user can register information with the mobile router only when the user is requested for inputting a password before registration and authenticated.

The information on the mobile terminal 10 registered with the mobile router 20 includes a unique ID (media access control (MAC) address)) for identifying a mobile terminal that performs communication and key information and other such information for encrypting transmission data or decrypting reception data.

Further, the information on the mobile router 20 registered with the mobile terminal 10 includes a unique ID (service set identifier (SSID)) for identifying a mobile router that performs wireless LAN communication, key information and other such information for encrypting transmission data or decrypting reception data, and information on a unique ID assigned to a mobile router serving as a device that performs NFC communication.

Figure 3:
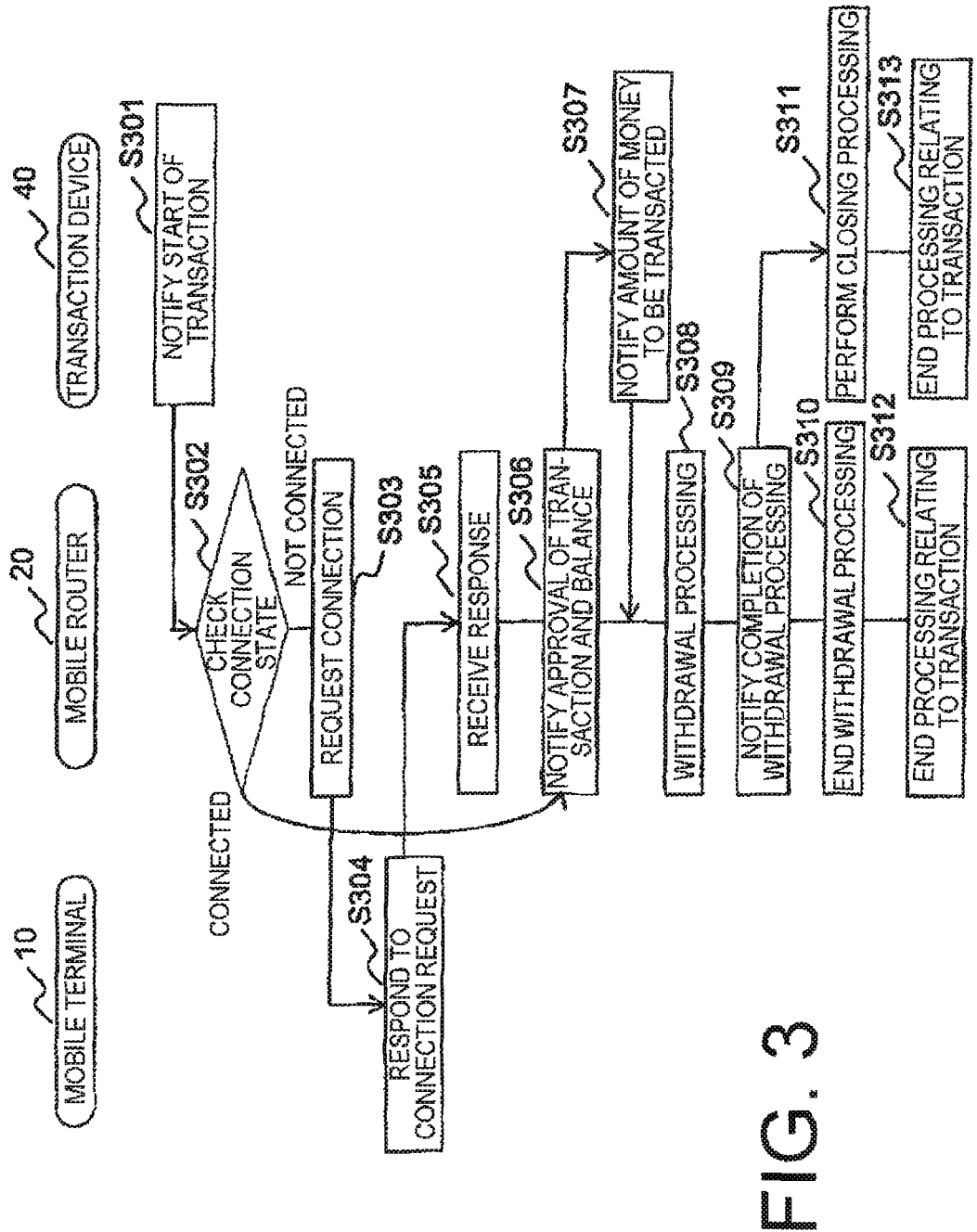
FIG. 3 is a sequence diagram for application at the time of transaction.

Now, a description is given of transaction of electronic money using the electronic money function of the mobile router 20 with reference to FIG. 3. FIG. 3 is a sequence diagram for application at the time of transaction. In the following, the description is based on the assumption that electronic money is prepaid and its balance is stored in the mobile router 20.

1) The transaction device 40 notifies the mobile router 20 of start of transaction (Step S301).

2) The mobile router 20 checks whether or not the registered mobile terminal 10 is connected (Step S302). When the registered mobile terminal 10 is not connected, the mobile router 20 proceeds to Step S303, or when the registered mobile terminal 10 is connected, the mobile router 20 proceeds to Step S306.

3) The mobile router 20 transmits a connection request to the registered mobile terminal 10 (Step S303).

4) The mobile terminal 10 transmits a response to the connection request to the router 20 (Step S304).

5) The mobile router 20 receives the response from the mobile terminal 10 (Step S305). The mobile router 20 only receives the response, and does not connect to the mobile terminal 10. Although not shown in the diagram, when the mobile terminal 10 does not transmit a response within a predetermined period of time (e.g., within 5 seconds), the mobile router 20 notifies the transaction device 40 of disapproval of transaction due to an error of not finding the mobile terminal 10 and ends the processing relating to transaction. The transaction device 40, which has received the notification of disapproval of transaction, ends the processing relating to transaction.

6) When the mobile terminal 10 is found through reception of the response, the mobile router 20 notifies the transaction device 40 that transaction is approved as well as the balance (Step S306).

7) The transaction device 40 notifies the mobile router 20 of the amount of money to be transacted (Step S307). Although not shown, when the amount of money to be transacted is larger than the balance, the transaction device 40 notifies the mobile router 20 that the transaction processing is suspended and ends the processing relating to transaction. The mobile router 20, which has received the notification of suspension of transaction, ends the processing relating to transaction.

8) The mobile router 20 performs withdrawal processing of updating the balance by withdrawing the amount of money to be transacted from the balance (Step S308).

9) The mobile router 20 notifies the transaction device 40 of completion of the withdrawal processing (Step S309).

10) The mobile router 20 ends the withdrawal processing (Step S310).

11) The transaction device 40 performs closing processing relating to the transaction in response to completion of the withdrawal processing, and transmits a statement of the transaction to the electronic money management device (Step S311).

12) The mobile router 20 ends the processing relating to the transaction (Step S312).

13) The transaction device 40 ends the processing relating to the transaction (Step S313).

As described above, it is checked whether or not there is the mobile terminal 10 registered with the mobile router 20 at the time of transaction of electronic money of the mobile router 20, and thus even when the mobile router 20 is lost or the mobile router 20 is stolen, there is no risk of a stranger using electronic money of the mobile router 20.

In the above description, the mobile router 20 only receives a response and does not connect to the mobile terminal 10 (Step S305). However, the mobile router 20 may connect to the mobile terminal 10, and notify the statement of the transaction for display on the mobile terminal 10.

Figure 4:
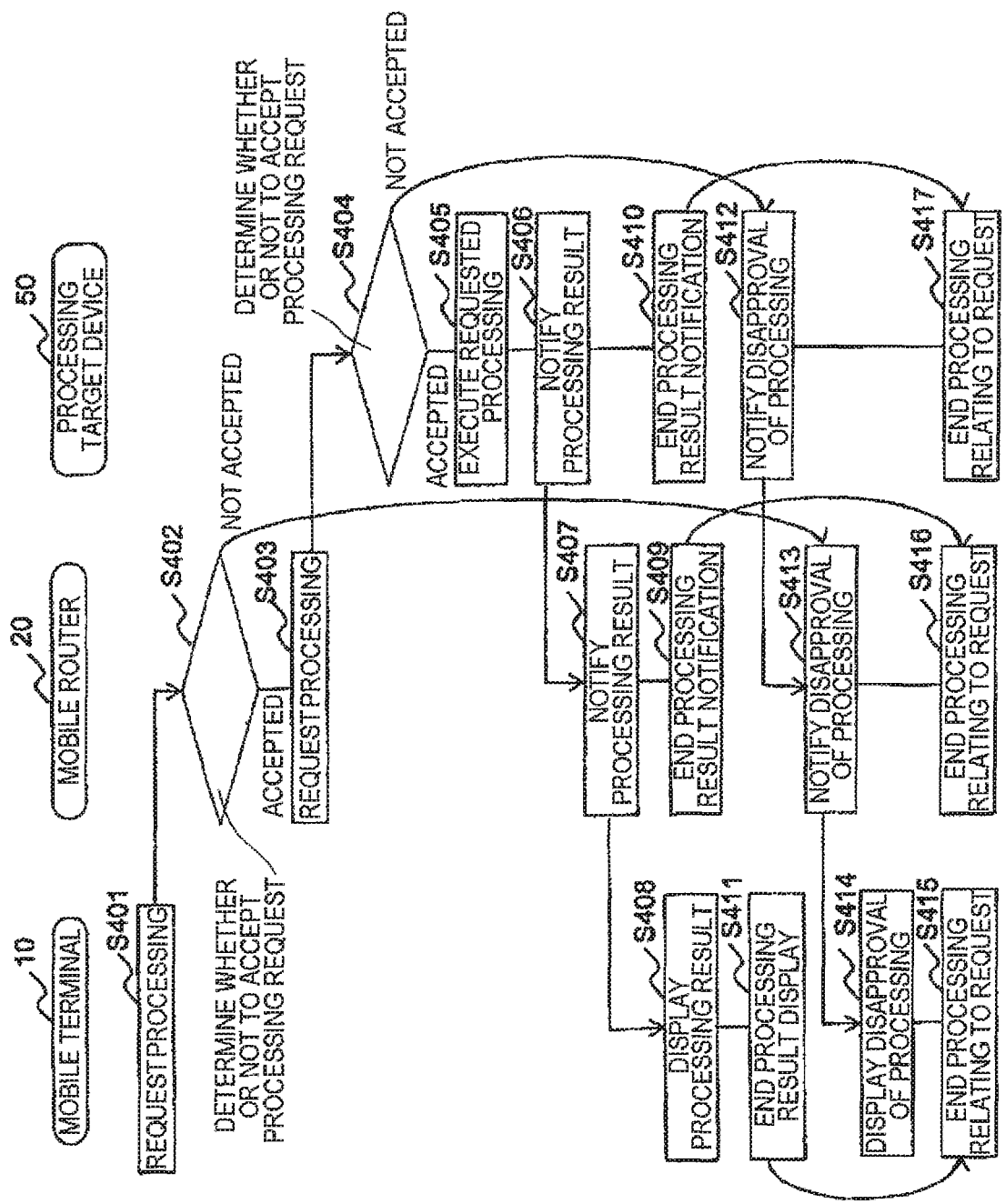
FIG. 4 is a sequence diagram for application at the time of a request for processing by the mobile terminal.

Next, a description is given of a case in which the mobile terminal 10 transmits a processing request (e.g., request for referring to history/statement) relating to electronic money to the mobile router 20 with reference to FIG. 4. FIG. 4 is a sequence diagram for application at the time of a request for processing by the mobile terminal 10.

1) The mobile terminal 10 requests the mobile router 20 for processing (Step S401).

2) The mobile router 20 determines whether or not to accept the processing request (Step S402). When the processing request is issued from the registered mobile terminal 10, the mobile router 20 determines to accept the processing request and proceeds to Step S403. On the contrary, when the processing request is not issued from the registered mobile terminal 10, the mobile router 20 determines not to accept the processing request and proceeds to Step S413.

3) The mobile router 20 requests the processing target device 50 (e.g., electronic money management device) for processing (Step S403). The mobile router 20 communicates to/from the processing target device 50 via the NFC communication unit 203.

4) The processing target device 50 determines whether or not to accept the processing request (Step S404). The processing target device 50 stores an identification number of the mobile router 20 for which to accept a processing request in advance, and when the processing request is issued from the registered mobile router 20, the processing target device 50 determines to accept the processing request and proceeds to Step S405. When the processing request is not issued from the registered mobile router 20, the processing target device 50 determines not to accept the processing request and proceeds to Step S412.

5) The processing target device 50 executes the requested processing (Step S405).

6) The processing target device 50 notifies the mobile router 20 of a processing result (e.g., history/statement of transaction of electronic money) (Step S406).

7) The mobile router 20 notifies the mobile terminal 10 of a processing result (e.g., history/statement of transaction of electronic money) (Step S407).

8) The mobile terminal 10 displays the processing result (e.g., history/statement of transaction of electronic money) (Step S408).

9) The mobile router 20 ends the processing result notification and proceeds to Step S416 (Step S409).

10) The processing target device 50 ends the processing result notification and proceeds to Step S417 (Step S410).

11) The mobile terminal 10 ends the processing result display and proceeds to Step S415 (Step S411).

12) The processing target device 50 notifies the mobile router 20 of disapproval of the processing (Step S412).

13) The mobile router 20 notifies the mobile terminal 10 of disapproval of the processing (Step S413).

14) The mobile terminal 10 displays disapproval of the processing (Step S414).

15) The mobile terminal 10 ends the processing relating to the processing request (Step S415).

16) The mobile router 20 ends the processing relating to the processing request (Step S416).

17) The processing target device 50 ends the processing relating to the processing request (Step S417).

When the processing request relates to checking of the balance, the processing target device 50 is not required in this embodiment, in which the balance is stored in the mobile router 20. Therefore, the balance is checked in accordance with a sequence obtained by removing the processing target device 50 and processing relating to the processing target device 50 from the sequence diagram of FIG. 4.

Figure 5:
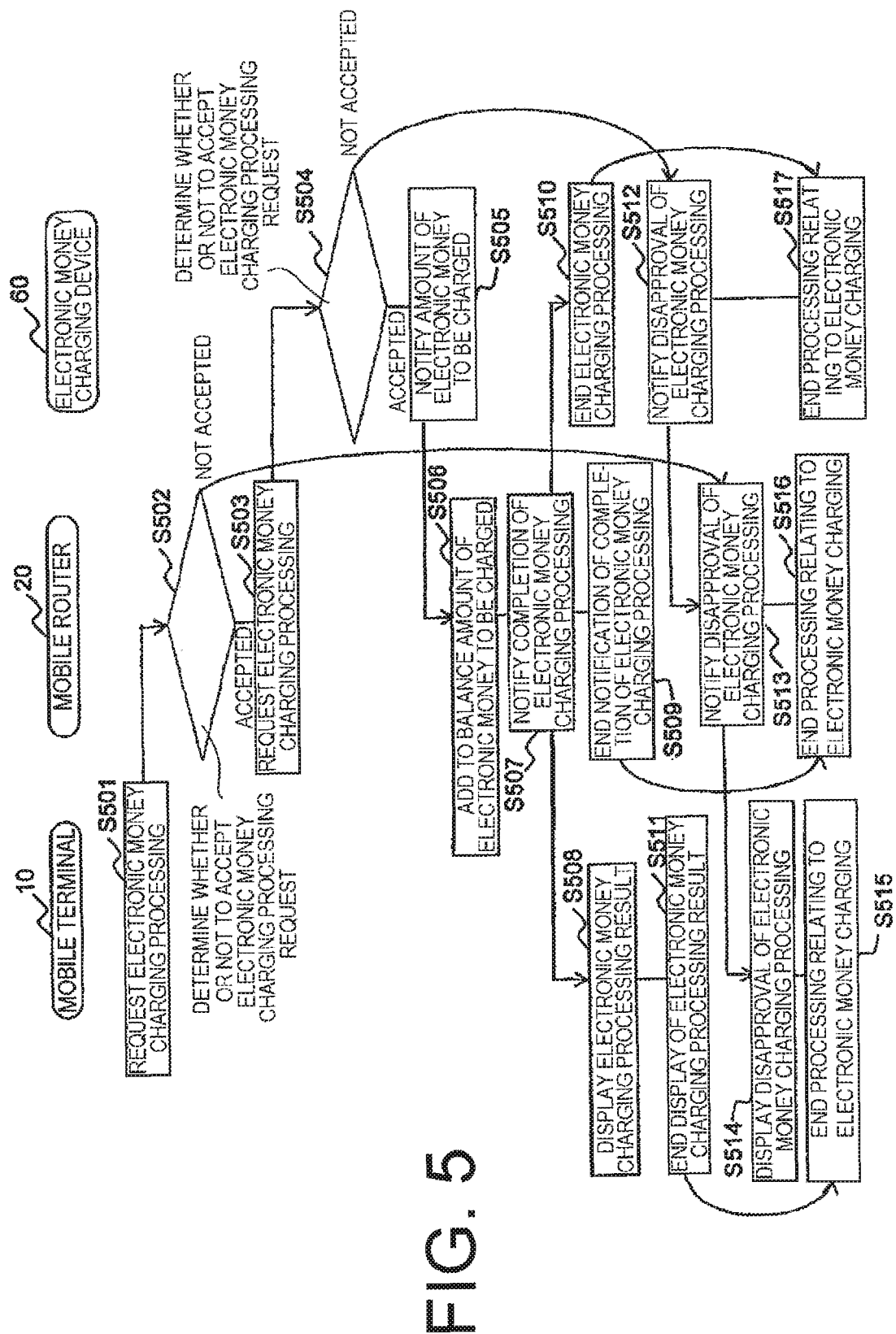
FIG. 5 is a sequence diagram for application at the time of charging electronic money.

Now, a description is given of a case in which electronic money is charged to the mobile router with reference to FIG. 5. FIG. 5 is a sequence diagram for application at the time of charging electronic money.

1) The mobile terminal 10 requests the mobile router 20 for electronic money charging processing (Step S501).

2) The mobile router 20 determines whether or not to accept the electronic money charging processing request (Step S502). When the electronic money charging processing request is issued from the registered mobile terminal 10, the mobile router 20 determines to accept the electronic money charging processing request and proceeds to Step S503. On the contrary, when the electronic money charging processing request is not issued from the registered mobile terminal, the mobile router 20 determines not to accept the electronic money charging processing request and proceeds to Step S513.

3) The mobile router 20 requests the electronic money charging device 60 for electronic money charging processing (Step S503). The mobile router 20 communicates to/from the electronic money charging device 60 via the NFC communication unit 203.

4) The electronic money charging device 60 determines whether or not to accept the electronic money charging processing request (Step S504). The electronic money charging device stores an identification number of the mobile router for which to accept an electronic money charging processing request in advance, and when the electronic money charging processing request is issued from the registered mobile router, the electronic money charging device determines to accept the electronic money charging processing request and proceeds to Step S505. When the electronic money charging processing request is not issued from the registered mobile router, the electronic money charging device determines not to accept the electronic money charging processing request and proceeds to Step S512.

5) The electronic money charging device 60 notifies the mobile router 20 of the amount of electronic money to be charged (Step S505).

6) The mobile router 20 adds to the balance the amount of electronic money to be charged and updates the balance (Step S506).

7) The mobile router 20 notifies the mobile terminal 10 and the electronic money charging device 60 of completion of electronic money charging processing (Step S507).

8) The mobile terminal 10 displays an electronic money charging processing result (Step S508).

9) The mobile router 20 ends notification of completion of the electronic money charging processing and proceeds to Step S516 (Step S509).

10) The electronic money charging device 60 ends the electronic money charging processing and proceeds to Step S517 (Step S510).

11) The mobile terminal 10 ends display of the electronic money charging processing result and proceeds to Step S515 (Step S511).

12) The electronic money charging device 60 notifies the mobile router 20 of disapproval of the electronic money charging processing (Step S512).

13) The mobile router 20 notifies the mobile terminal 10 of disapproval of the electronic money charging processing (Step S513).

14) The mobile terminal 10 displays disapproval of the electronic money charging processing (Step S514).

15) The mobile terminal 10 ends the processing relating to electronic money charging (Step S515).

16) The mobile router 20 ends the processing relating to electronic money charging (Step S516).

17) The electric money charging device 60 ends the processing relating to electronic money charging (Step S517).

Electronic money may be charged through execution of the transaction sequence of FIG. 3 (negative amount of charged electronic money is set as amount of money to be transacted).

Second Embodiment

Next, a second embodiment of this invention is described with reference to FIG. 6 and FIG. 7.

The second embodiment is different from the first embodiment in that the mobile router 20 periodically transmits a connection request to the mobile terminal 10 to check whether or not there is a response and sets a response flag when there is a response (corresponding to recording of whether or not there is response), and in that, at the time of transaction, the mobile router 20 checks the state of the response flag (corresponding to referring to whether or not there is response) to check whether or not there is a mobile terminal and determine whether or not to approve transaction.

Figure 6:
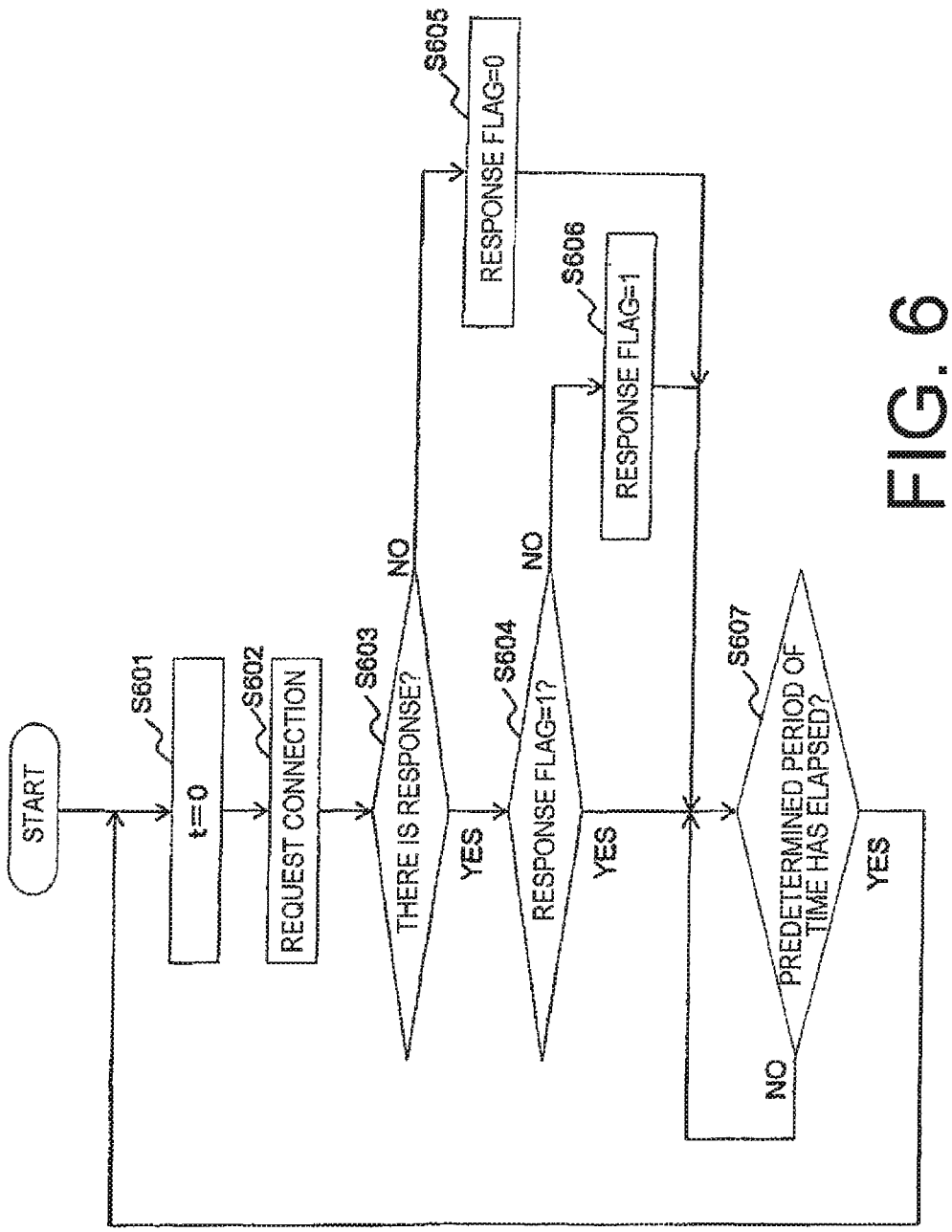
FIG. 6 is a flowchart for execution by a control unit of the mobile router.

Now, a description is given of the mobile router 20 periodically transmitting a connection request to a mobile terminal to check whether or not there is a response and setting a response flag when there is a response with reference to FIG. 6. FIG. 6 is a flowchart for execution by the control unit 204 of the mobile router 20.

1) The mobile router 20 clears (t=0) a time t of a timer (Step S601).

2) The mobile router 20 transmits a connection request to the registered mobile terminal 10 (Step S602).

3) The mobile router 20 proceeds to Step S604 when there is a response to the connection request from the mobile terminal 10 (YES in Step S603), or proceeds to Step S605 when there is no response to the connection request from the mobile terminal 10 within a predetermined period of time (e.g., within five seconds) (NO in Step S603). In this step, the mobile router 20 only receives the response, and does not connect to the mobile terminal.

4) The mobile router 20 proceeds to Step S607 when the response flag is set (response flag=1) (YES in Step S604), or proceeds to Step S606 when the response flag is not set (response flag=0) (NO in Step S604).

5) The mobile router 20 sets the response flag to "0" (response flag=0) (Step S605).

5) The mobile router 20 sets the response flag to "1" (response flag=1) (Step S606).

7) The mobile router 20 determines whether or not a predetermined period of time (e.g., t≥60 seconds) has elapsed (Step S607). The mobile router 20 returns to Step S601 when the predetermined period of time has elapsed (YES in Step S607), or repeats Step S607 when the predetermined period of time has not elapsed (e.g., t<60 seconds) (NO in Step S607).

Figure 7:
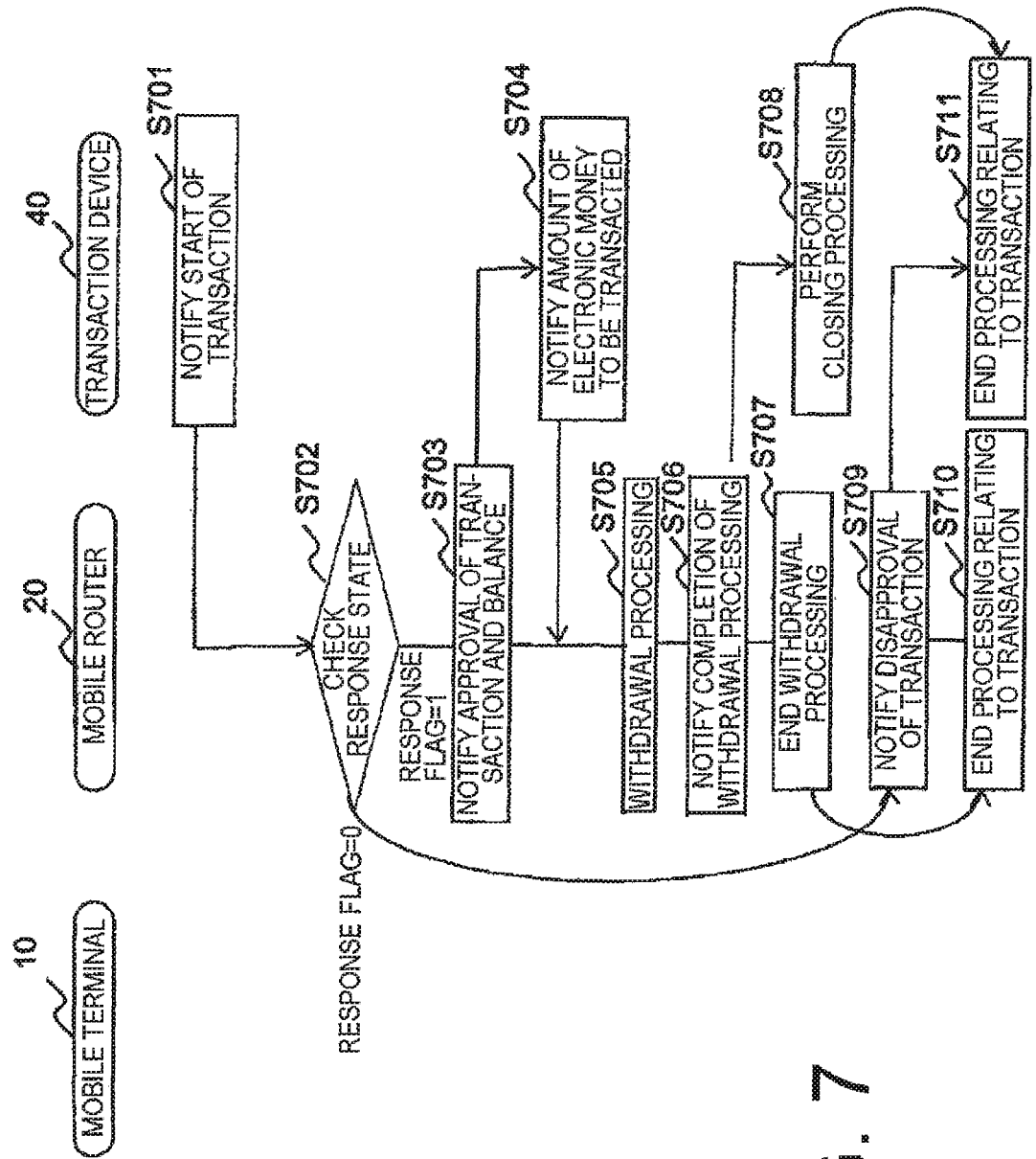
FIG. 7 is a sequence diagram for application at the time of transaction.

Next, a description is given of transaction of electronic money using the electronic money function of the mobile router 20 with reference to FIG. 7. FIG. 7 is a sequence diagram for application at the time of transaction. In the following, the description is based on the assumption that electronic money is prepaid and its balance is stored in the mobile router.

1) The transaction device 40 notifies the mobile router 20 of start of transaction (Step S701).

2) The mobile router 20 checks the response state of the registered mobile terminal 10 (Step S702). When the response flag is "1", the mobile router 20 checks the response state (Step S702). The mobile router 20 proceeds to Step S703 when the response flag is "1", or proceeds to Step S709 when the response flag is "0".

3) The mobile router 20 notifies the transaction device 40 that transaction is approved as well as the balance (Step S703).

4) The transaction device 40 notifies the mobile router 20 of the amount of money to be transacted (Step S704). Although not shown, when the amount of money to be transacted is larger than the balance, the transaction device 40 notifies the mobile router 20 that the transaction processing is suspended and ends the processing relating to transaction.

5) The mobile router 20 performs withdrawal processing of updating the balance by withdrawing the amount of money to be transacted from the balance (Step S705). The mobile router 20 ends the processing relating to the transaction when receiving the notification of suspension of the transaction.

6) The mobile router 20 notifies the transaction device 40 of completion of the withdrawal processing (Step S706).

7) The mobile router 20 ends the withdrawal processing, and proceeds to Step S710 (Step S707).

8) The transaction device 40 performs closing processing relating to the transaction in response to completion of the withdrawal processing, and transmits a statement of the transaction to the electronic money management device (Step S708) before proceeding to Step S711.

9) The mobile router 20 notifies the transaction device 40 of disapproval of transaction (Step S709).

10) The mobile router 20 ends the processing relating to the transaction (Step S710).

11) The transaction device 40 ends the processing relating to the transaction (Step S711).

As described above, a response to the connection request from the mobile terminal within a predetermined period of time is checked at the time of transaction of electronic money of the mobile router 20 equivalently to checking whether or not there is the mobile terminal 10 registered with the mobile router 20. Thus, even when the mobile router 20 is lost or the mobile router 20 is stolen, there is no risk of a stranger using electronic money of the mobile router 20.

Although not shown, the mobile router 20 may connect to the mobile terminal 10 at the time of transaction, and the mobile router 20 may notify the statement of the transaction for display on the mobile terminal 10.

Figure 8:
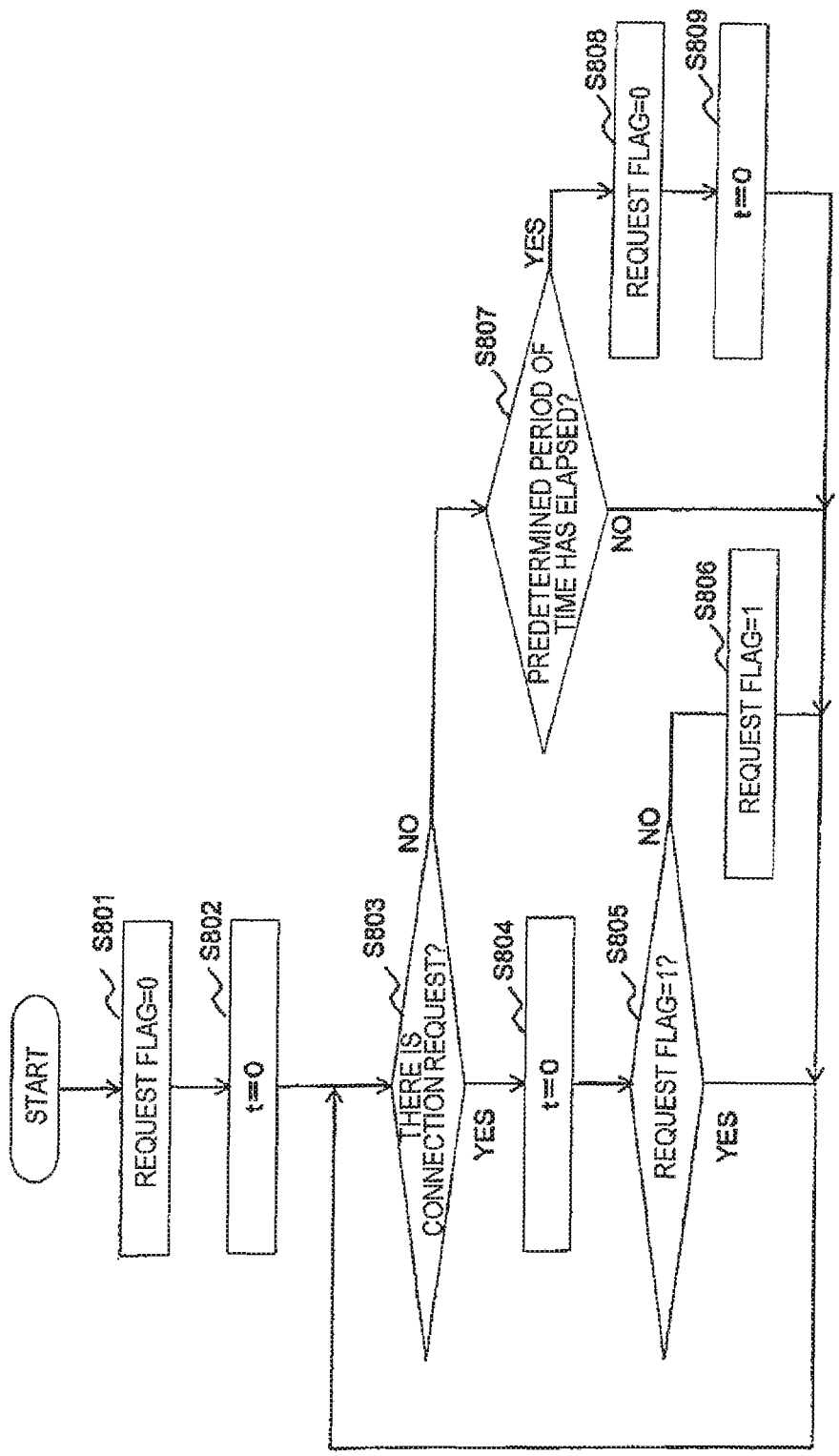
FIG. 8 is a flowchart for execution by the control unit of the mobile router.

In the description given above, whether or not to approve transaction is determined based on the state of the response flag, but the mobile terminal 10 may transmit a connection request periodically (e.g., every 60 seconds) to the mobile router 20, set a request flag (corresponding to recording of connection request) when there is a connection request, check whether or not there is a mobile terminal based on the state of the request flag (corresponding to referring to whether or not there is connection request), and determine whether or not to approve transaction. FIG. 8 is a flowchart for execution by the control unit of the mobile router 20 in this case.

1) The mobile router 20 sets the request flag to "0" (request flag=0) (Step S801).

2) The mobile router 20 clears (t=0) the time t of the timer (Step S802).

3) The mobile router 20 proceeds to Step S804 when there is a connection request from the mobile terminal 10 (YES in Step S803), or proceeds to Step S807 when there is no connection request from the mobile terminal 10 (NO in Step S803).

4) The mobile router 20 clears (t=0) the time t of the timer (Step S804).

5) The mobile router 20 returns to Step S803 when the request flag is set (request flag=1) (YES in Step S805).

When the request flag is not set (request flag=0), the mobile router 20 proceeds to Step S806 (NO in Step S805).

6) The mobile router 20 sets the request flag to "1" (request flag=1), and returns to Step S803 (Step S806).

7) The mobile router 20 determines whether or not a predetermined period of time (e.g., t≥61 seconds, which is period of time slightly longer than interval between connection requests of mobile terminal) has elapsed. When the predetermined period of time has elapsed (YES in Step S807), the mobile router 20 proceeds to Step S808. On the contrary, when the predetermined period of time has not elapsed (e.g., t<61 seconds) (NO in Step S807), the mobile router 20 returns to Step S803.

8) The mobile router 20 sets the request flag to "0" (request flag=0) (Step S808).

9) The mobile router 20 clears the time t of the tinier (t=0) (Step S809), and returns to Step S803.

As described above, also in this case, a connection request from the mobile terminal within a predetermined period of time is checked at the time of transaction of electronic money of the mobile router 20 equivalently to checking of whether or not there is the mobile terminal 10 registered with the mobile router. Thus, even when the mobile router 20 is lost or the mobile router 20 is stolen, there is no risk of a stranger using electronic money of the mobile router 20.

This invention is not limited to the first embodiment and the second embodiment described above. For example, the mobile router 20 may be configured to allow use of any one of the transaction methods of the first embodiment and the second embodiment, to thereby enable selection of any one of those transaction methods.

Further, the configurations of the mobile routers according to the first and second embodiments described above may be those illustrated in FIG. 9. That is, an NFC control unit 207 configured to perform processing relating to electronic money is provided separately from a control unit 204 of a mobile router 21, and the NFC information storage unit 2002 is provided outside the storage unit 206. The control unit 204 of the mobile router 21 uses information stored in the NFC information storage unit 2002 to control the processing relating to electronic money via the NFC control unit 207. Other configurations of the mobile router 21 are the same as those of the mobile router 20.

In the first and second embodiments described above, a first wireless communication method and a second wireless communication method are set to the NFC and the wireless LAN, respectively. However, the method of the second wireless communication, which is communication between the mobile terminal and the mobile router, is not limited to wireless LAN communication, and may be near field wireless communication (e.g., Bluetooth or ZigBee), which is not a wireless communication method that is used for electronic money. That is, near field wireless communication and wireless LAN communication may be used in combination. In this case, the near field wireless communication refers to wireless communication that has a longer communication distance than the NFC and a shorter communication distance than the wireless LAN. Currently, IEEE 802.15.1 is defined as Bluetooth standards, IEEE 802.15.4 is defined as ZigBee standards, and IEEE 802.11a/b/g/n is defined as wireless LAN standards.

Further, when the mobile terminal does not "refer to history/statement" of transactions of electronic money and charges electronic money also through the sequence of transaction, a dedicated application program does not need to be downloaded into the mobile terminal.

Further, in the first embodiment and the second embodiment described above, the description is based on the assumption that electronic money is prepaid and its balance is stored in the mobile router. However, electronic money is not limited thereto, and may be postpaid or paid online. Transaction of electronic money is made online by connecting a host computer of a banking institution, a credit card company, or an electronic money service company to a transaction terminal online.

The mobile terminal and the mobile router in the systems of respective embodiments described above are configured by hardware or a combination of hardware and software. However, all or a part of functions of the mobile terminal and all or a part of functions of the mobile router may be implemented by software. Further, the method of processing relating to electronic money, for example, the electronic money transaction method described above, is also configured by hardware or a combination of hardware and software. However, the method may be implemented by software. The phrase "implemented by software" means implementing the method by a computer reading and executing a program. When the method is configured by hardware, a part or all of constituent units of the mobile terminal 10 and a part or all of constituent units of the mobile routers 20 and 21 illustrated in FIG. 2 or FIG. 9 may be configured by an integrated circuit (IC) such as a large scale integrated circuit (LSI), an application specific integrated circuit (ASIC), a gate array, and a field programmable gate array (FPGA).

Figure 9:
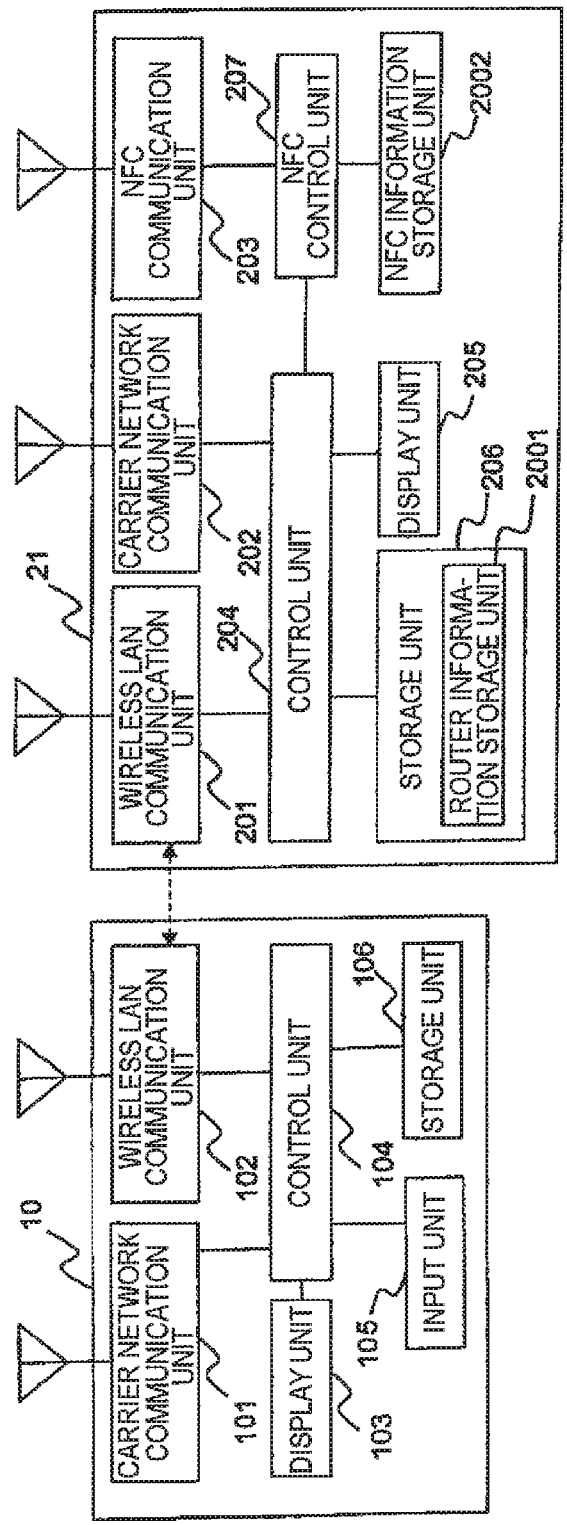
FIG. 9 includes configuration diagrams of the mobile terminal and a mobile router of another configuration.

When the method is configured by software, a part or all of functions of the control unit 104 of the mobile terminal 10 and a part or all of functions of the control units 204 of the mobile routers 20 and 21 may be configured by a storage unit that stores a program, for example, a hard disk or a ROM, a display unit, for example, a liquid crystal display, a DRAM that stores data necessary for calculation, a CPU, and a bus that connects those units. A part or all of functions of the mobile terminal according to this embodiment and/or a part or all of functions of the mobile router according to this embodiment may be implemented by a program by, for example, describing in the program a part or all of operations of the control unit 104 of the mobile terminal 10 and the control units 204 of the mobile routers 20 and 21, which are illustrated in FIG. 1 or FIG. 9, storing the program into a storage unit, for example, a ROM, storing information necessary for calculation into a DRAM, and causing a CPU to operate the program.

The program can be stored using various types of non-transitory computer-readable media to be supplied to the computer. Non-transitory computer-readable media include various types of tangible storage media. Examples of non-transitory computer-readable media include magnetic recording media (e.g., flexible disks, magnetic tape, and hard disk drives), magneto-optical recording media (e.g., magneto-optical disks), CD-ROMs (ROM stands for Read Only Memory), CD-Rs, CD-R/Ws, and semiconductor memories (e.g., mask ROMs, programmable ROMs (PROMs), erasable PROMs (EPROMs), flash ROMs, and random access memories (RAMs)). The program may also be supplied to the computer via various types of transitory computer-readable media. Examples of transitory computer-readable media include electric signals, optical signals, and electromagnetic waves. The program on a transitory computer-readable medium can be supplied to the computer through power lines, optical fibers, and other wired communication paths, or through wireless communication paths.

As described above, representative embodiments of this invention have been described, but this invention can be implemented in other various kinds of forms without departing from the spirit or main feature defined by the appended claims of this application. Thus, the embodiments described above are merely examples, and are not to be interpreted in a limited manner. The scope of this invention is represented by the appended claims, and is not limited by descriptions of the specification and the abstract. Further, all modifications and changes that belong to an equivalent scope of the appended claims fall within the scope of this invention.

This application claims priority from Japanese Patent Application No. 2015-140381, filed on Jul. 14, 2015, the entire disclosure of which is incorporated herein by reference.

Some or all of the embodiments described above can also be described by the following supplementary notes, but are not limited to the following configurations.

(Supplementary Note 1)

A mobile router, which is configured to perform transaction of electronic money, the mobile router comprising:

a first wireless communication unit configured to perform communication by a first wireless communication method;

a second wireless communication unit configured to perform communication by a second wireless communication method different from the first wireless communication method; and a storage unit configured to register a mobile terminal that is allowed to use transaction of electronic money, wherein the mobile router is configured to perform transaction of electronic money through communication by the first wireless communication unit when the mobile router has confirmed presence of the mobile terminal through communication to and from the mobile terminal by the second wireless communication unit before transaction of electronic money.

(Supplementary Note 2)

A mobile router according to Supplementary Note 1, wherein the mobile router is configured to confirm presence of the mobile terminal by transmitting a connection request to the mobile terminal from the second wireless communication unit and determining whether or not there is a response to the connection request from the mobile terminal before transaction of electronic money.

(Supplementary Note 3)

A mobile router according to Supplementary Note 1, wherein the mobile router is configured to confirm presence of the mobile terminal by transmitting a connection request to the mobile terminal from the second wireless communication unit to store whether or not there is a response, and referring to whether or not there is the response before transaction of electronic money.

(Supplementary Note 4)

A mobile router according to Supplementary Note 1, wherein the mobile router is configured to confirm presence of the mobile terminal by recording a connection request transmitted from the mobile terminal and referring to whether or not there is the connection request before transaction of electronic money.

(Supplementary Note 5)

An electronic money transaction system, comprising: the mobile router of any one of Supplementary Notes 1 to 4; and a mobile terminal configured to communicate to and from the mobile router by the second wireless communication method.

(Supplementary Note 6)

An electronic money transaction method, which is executed by a mobile router configured to perform transaction of electronic money through communication by a first wireless communication method and communicate to and from a mobile terminal that is allowed to use the transaction of electronic money through communication by a second wireless communication method different from the first wireless communication method, the electronic money transaction method comprising performing transaction of electronic money through communication by the first wireless communication method when having confirmed presence of the mobile terminal through communication to and from the mobile terminal by the second wireless communication method before transaction of electronic money.

(Supplementary Note 7)

An electronic money transaction method according to Supplementary Note 6, wherein the confirming of presence of the mobile terminal comprises transmitting a connection request to the mobile terminal through communication by the second wireless communication method and determining whether or not there is a response to the connection request from the mobile terminal before transaction of electronic money.

(Supplementary Note 8)

An electronic money transaction method according to Supplementary Note 6, wherein the confirming of presence of the mobile terminal comprises transmitting a connection request to the mobile terminal through communication by the second wireless communication method to store whether or not there is a response, and referring to whether or not there is the response before transaction of electronic money.

(Supplementary Note 9)

An electronic money transaction method according to Supplementary Note 6, wherein the confirming of presence of the mobile terminal comprises recording a connection request transmitted from the mobile terminal through communication by the second wireless communication method and referring to whether or not there is the connection request before transaction of electronic money.

(Supplementary Note 10)

An electronic money transaction program for causing a computer, which functions as a mobile router configured to perform transaction of electronic money through communication by a first wireless communication method and communicate to and from a mobile terminal that is allowed to use the transaction of electronic money through communication by a second wireless communication method different from the first wireless communication method, to execute the procedures of:

confirming presence of the mobile terminal through communication to and from the mobile terminal by the second wireless communication method before transaction of electronic money; and performing transaction of electronic money through communication by the first wireless communication method when having confirmed presence of the mobile terminal.

(Supplementary Note 11)

An electronic money transaction program according to Supplementary Note 10, wherein the confirming of presence of the mobile terminal comprises transmitting a connection request to the mobile terminal through communication by the second wireless communication method and determining whether or not there is a response to the connection request from the mobile terminal before transaction of electronic money.

(Supplementary Note 12)

An electronic money transaction program according to Supplementary Note 10, wherein the confirming of presence of the mobile terminal comprises transmitting a connection request to the mobile terminal through communication by the second wireless communication method to store whether or not there is a response, and referring to whether or not there is the response before transaction of electronic money.

(Supplementary Note 13)

An electronic money transaction program according to Supplementary Note 10, wherein the confirming of presence of the mobile terminal comprises recording a connection request transmitted from the mobile terminal through communication by the second wireless communication method and referring to whether or not there is the connection request before transaction of electronic money.

(Supplementary Note 14)

A mobile router according to any one of Supplementary Notes 1 to 4, in which the first wireless communication method includes NFC communication.

(Supplementary Note 15)

A mobile router according to any one of Supplementary Notes 1 to 4, in which the second wireless communication method has a communication distance longer than a communication distance of the first wireless communication method.

(Supplementary Note 16)

An electronic money transaction method according to any one of Supplementary Notes 6 to 9, in which the first wireless communication method includes NFC communication.

(Supplementary Note 17)

An electronic money transaction method according to any one of Supplementary Notes 6 to 9, in which the second wireless communication method has a communication distance longer than a communication distance of the first wireless communication method.

(Supplementary Note 18)

An electronic money transaction program according to any one of Supplementary Notes 10 to 13, in which the first wireless communication method includes NFC communication.

(Supplementary Note 19)

A mobile router, including:

an NFC communication unit configured to perform communication for processing relating to electronic money;

a wireless communication unit configured to perform communication to and from a mobile terminal by a wireless communication method different from a wireless communication method of the NFC communication unit; and a storage unit configured to store information on a mobile terminal that is allowed to use the electronic money.

INDUSTRIAL APPLICABILITY

This invention is used for processing relating to electronic money, and more specifically, for a mobile router, a mobile network system, an electronic money transaction method, and an electronic money transaction program, which are used to transact electronic money.

REFERENCE SIGNS LIST 10 mobile terminal
20 mobile router
30 carrier network
40 transaction device
50 processing target device
60 electronic money charging device
101 carrier network communication unit
102 wireless LAN communication unit
103 display unit
104 control unit
105 input unit
106 storage unit
201 wireless LAN communication unit
202 carrier network communication unit
203 NFC communication unit
204 control unit
205 display unit
206 storage unit
207 NFC control unit
2001 router information storage unit
2002 NFC information storage unit

The invention claimed is:

1. A mobile router, which is configured to perform transaction of electronic money, the mobile router comprising:

a Near Field Communication (NFC) communication unit configured to perform communication for processing relating to the electronic money by an NFC communication method;

a wireless LAN communication unit configured to perform communication by a wireless LAN communication method different from the NFC communication method;

a carrier network communication unit configured to perform communication by a carrier network communication method different from the NFC communication method and the wireless LAN communication method; and a storage unit configured to register, as a mobile terminal that is allowed to use the transaction of electronic money, a mobile terminal which performs carrier network communication via the carrier network communication unit by communication to and from the wireless LAN communication unit and which cannot use the electronic money by the NFC communication method, wherein the mobile router is configured to perform the transaction of electronic money of the mobile terminal through the communication for processing relating to the electronic money by the NFC communication unit only when the mobile router has confirmed presence of the mobile terminal through communication to and from the mobile terminal by the wireless LAN communication unit by determining whether or not there is a response or a router connection request transmitted from the mobile terminal within a predetermined period of time before the transaction of electronic money.

2. A mobile router according to claim 1, wherein the mobile router is configured to confirm presence of the mobile terminal by transmitting a terminal connection request to the mobile terminal from the wireless LAN communication unit and determining whether or not there is the response to the terminal connection request from the mobile terminal within the predetermined period of time before the transaction of electronic money.

3. A mobile router according to claim 1, wherein the mobile router is configured to confirm presence of the mobile terminal by transmitting a terminal connection request to the mobile terminal from the wireless LAN communication unit to store whether or not there is the response from the mobile terminal within the predetermined period of time, and referring to whether or not there is the response before the transaction of electronic money.

4. A mobile router according to claim 1, wherein the mobile router is configured to confirm presence of the mobile terminal by recording the router connection request transmitted from the mobile terminal within the predetermined period of time and referring to whether or not there is the router connection request before the transaction of electronic money.

5. An electronic money transaction system, comprising:
the mobile router of claim 1; and
a mobile terminal configured to communicate to and from the mobile router by the wireless LAN communication method.

6. An electronic money transaction method, which is executed by a mobile router configured to perform transaction of electronic money through communication by a Near Field Communication (NFC) communication method, communicate to and from a mobile terminal that is allowed to use the transaction of electronic money through communication by a wireless LAN communication method different from the NFC communication method, and perform carrier network communication by a carrier network communication method different from the NFC communication method and the wireless LAN communication method,
the electronic money transaction method comprising:
registering, as the mobile terminal that is allowed to use the transaction of electronic money, a mobile terminal which communicates to and from the mobile router by the wireless LAN communication method, which performs carrier network communication via the mobile router by the carrier network communication method, and which cannot use the electronic money by the NFC communication method; and
performing the transaction of electronic money of the mobile terminal through the communication for processing relating to the electronic money by the NFC communication method only when having confirmed presence of the mobile terminal through communication to and from the mobile terminal by the wireless LAN communication method by determining whether or not there is a response or a router connection request transmitted from the mobile terminal within a predetermined period of time before the transaction of electronic money.

7. An electronic money transaction method according to claim 6, wherein the confirming of presence of the mobile terminal comprises transmitting a terminal connection request to the mobile terminal through communication by the wireless LAN communication method and determining whether or not there is the response to the connection request from the mobile terminal within the predetermined period of time before the transaction of electronic money.

8. An electronic money transaction method according to claim 6, wherein the confirming of presence of the mobile terminal comprises transmitting a terminal connection request to the mobile terminal through communication by the wireless LAN communication method to store whether or not there is the response from the mobile terminal within the predetermined period of time, and referring to whether or not there is the response before the transaction of electronic money.

9. An electronic money transaction method according to claim 6, wherein the confirming of presence of the mobile terminal comprises recording the router connection request transmitted from the mobile terminal through communication by the wireless LAN communication method within the predetermined period of time and referring to whether or not there is the router connection request before the transaction of electronic money.

10. A non-transitory computer readable medium storing an electronic money transaction program for causing a computer, which functions as a mobile router configured to perform transaction of electronic money through communication by a Near Field Communication (NFC) communication method, communicate to and from a mobile terminal that is allowed to use the transaction of electronic money through communication by a wireless LAN communication method different from the NFC communication method, and perform carrier network communication by a carrier network communication method different from the NFC communication method and the wireless LAN communication method, to execute the procedures of:

registering, as the mobile terminal that is allowed to use the transaction of electronic money, a mobile terminal which communicates to and from the mobile router by the wireless LAN communication method, which performs carrier network communication via the mobile router by the carrier network communication method, and which cannot use the electronic money by the NFC communication method;

confirming presence of the mobile terminal through communication to and from the mobile terminal by the wireless LAN communication method by determining whether or not there is a response or a router connection request transmitted from the mobile terminal within a predetermined period of time before the transaction of electronic money; and performing the transaction of electronic money of the mobile terminal through the communication for processing relating to the electronic money by the NFC communication method only when having confirmed presence of the mobile terminal.

* * * * *

UNITED STATES PATENT AND TRADEMARK OFFICE
CERTIFICATE OF CORRECTION

PATENT NO. : 10,609,738 B2
APPLICATION NO. : 15/571864
DATED : March 31, 2020
INVENTOR(S) : Masato Yoshikawa Page 1 of 1

It is certified that error appears in the above-identified patent and that said Letters Patent is hereby corrected as shown below:

In the Specification

Column 6, Modes for Embodying the Invention, Line 4; Before "router", insert --mobile--

Column 11, Modes for Embodying the Invention, Line 16; Delete "tinier" and insert --timer-- therefor Signed and Sealed this
Twenty-first Day of July, 2020

Andrei Iancu
*Director of the United States Patent and Trademark Office*